(12) United States Patent  (10) Patent No.: US 6,588,793 B2
Rose                        (45) Date of Patent:    Jul. 8, 2003

(54) THIN AIRBAG MODULE DESIGN FOR OVERHEAD APPLICATIONS

(75) Inventor: Larry D. Rose, South Weber, UT (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 09/956,532

(22) Filed: Sep. 19, 2001

(65) Prior Publication Data

US 2003/0052476 A1 Mar. 20, 2003

(51) Int. Cl.[7] .......................... B60R 21/20; B60R 21/22
(52) U.S. Cl. ............................ 280/728.2; 280/730.1
(58) Field of Search .................. 280/728.2, 730.1, 280/730.2, 732, 728.1, 743.1

(56) References Cited

U.S. PATENT DOCUMENTS

| | | | | |
|---|---|---|---|---|
| 5,209,519 A | * | 5/1993 | Shiga et al. | 280/728.2 |
| 5,340,148 A | * | 8/1994 | Faigle et al. | 280/730.2 |
| 5,470,103 A | | 11/1995 | Vaillancourt et al. | |
| 5,602,734 A | | 2/1997 | Kithil | |
| 5,692,768 A | * | 12/1997 | Mihm et al. | 280/728.2 |
| 5,775,726 A | | 7/1998 | Timothy et al. | |
| 6,029,996 A | * | 2/2000 | Yoshioka et al. | 280/743.1 |
| 6,135,495 A | * | 10/2000 | Redgrave et al. | 280/732 |

FOREIGN PATENT DOCUMENTS

| | | | |
|---|---|---|---|
| DE | 198 60 933 | | 7/2000 |
| GB | 2345669 | | 7/2000 |
| JP | 7-117605 | * | 5/1995 |
| JP | 11-291854 | * | 10/1999 |

* cited by examiner

*Primary Examiner*—Peter C. English
(74) *Attorney, Agent, or Firm*—Sally J. Brown; James D. Erickson (57) ABSTRACT

A thin compressible overhead airbag module provides inflatable overhead passive restraint protection to out of position occupants within a vehicle. The flat module design is compressed following assembly, making the compressed module thin enough to be mounted in the overhead space between the vehicle roof skin and the interior headliner. The general design includes an inflator, an inflatable cushion, and a 2-piece compressible housing. The compressible housing provides substantially more packaging space for the cushion. The roof area design allows the use of a longer, small diameter inflator. Upon activation, the car forward location of the inflator relative to the inflatable cushion forces the housing to deform below the inflator. The inflation force generated by the inflator effectively pulls the inflatable cushion out of the airbag module.

46 Claims, 8 Drawing Sheets

THIN AIRBAG MODULE DESIGN FOR OVERHEAD APPLICATIONS

BACKGROUND OF THE INVENTION

1. Field of the Invention

The present invention relates to overhead airbag inflation systems in motor vehicles. More specifically, the invention relates to a compressible airbag module design for overhead airbag applications.

2. Description of Related Art

Inflatable airbags are well accepted for use in motor vehicles and have been credited with preventing numerous deaths and injuries. Some statistics estimate that frontal airbags reduce the fatalities in head-on collisions by 25% among drivers using seat belts and by more than 30% among unbelted drivers. Statistics further suggest that with a combination of seat belt and airbag, serious chest injuries in frontal collisions can be reduced by 65% and serious head injuries by up to 75%. Airbag use presents clear benefits and vehicle owners are frequently willing to pay the added expense for airbags.

The inclusion of inflatable safety restraint devices, or airbags, is now a legal requirement for many new vehicles. Airbags are typically installed in the steering wheel and in the instrument panel on the passenger side of a car. In the event of an accident, an electronic control unit (ECU) within the vehicle measures the abnormal deceleration via an accelerometer and triggers the ignition of an explosive charge. Expanding gases from the charge fill the airbags, which immediately inflate in front of the driver and passenger to protect them from impact against the windshield or instrument panel.

An airbag cover, also called a trim cover panel, covers a compartment containing the airbag module and may reside on a steering wheel, dashboard, vehicle door, along a vehicle roof rail, vehicle wall, or beneath the dash board. The airbag cover is typically made of a rigid plastic and may be forced open by the pressure from the deploying airbag. In deploying the airbag, it is preferable to retain the airbag cover to prevent the airbag cover from flying loose in the passenger compartment. If the airbag cover freely moves into the passenger compartment, it may injure a passenger.

Airbag apparatuses have been primarily designed for deployment in front of the torso of an occupant between the upper torso of an occupant and the instrument panel. Conventional airbags, such as driver's or passenger airbags (hereinafter referenced as the "traditional airbag"), protect the occupant's upper torso and head from colliding with a windshield or instrument panel. Traditional airbag modules for frontal occupant protection deploy from the instrument panel (passenger side) or from the steering wheel (driver side). This location has several disadvantages including poor out of position (OOP) performance and unaesthetic visible instrument panel or steering wheel tear seams.

In fact, many known airbags have poor OOP performance for occupants. These airbags tend to direct the initial deployment energy toward the expected position of the occupant. While these designs help a properly positioned occupant avoid injury, placement of the airbag too close to an OOP occupant increases the risk that the occupant will be injured by the airbag itself. The speed at which the airbags in general, and especially front impact airbags, must deploy to adequately protect people requires that they inflate with considerable speed and force. With an OOP occupant, the risk of injury dramatically increases, as the models used to calculate desired deployment are considerably different. For example, an OOP occupant is most likely not wearing a safety restraint, whereas, the expected occupant position calculations generally anticipate that the occupant is wearing a seatbelt. Without a seatbelt, the inertia of the OOP occupant keeps them moving forward towards the instrument panel and windshield. The inertial motion of the OOP occupant also amplifies the force of the impact of the OOP occupant with the airbag over a properly restrained occupant. Furthermore, because the OOP occupant may be closer to the windshield and instrument panel, the airbag has less time to be successfully deployed. This dramatically increases the likelihood that the OOP occupant will have a secondary impact with the vehicle as the airbag does not have time to be properly deployed. Accordingly, a need exists for an airbag module that also provides protection to an OOP occupant.

In addition to poor OOP performance, airbags of all types known in the art have a number of additional disadvantages. One exemplary disadvantage of traditional airbag configurations is that they are too bulky for convenient overhead installation and use within a vehicle. Some vehicles simply do not have the vertical space in the roof of the vehicle to accommodate the bulk of certain cushion members and their respective inflators, such as those necessary for traditional overhead airbag configurations. Some attempt to build an overhead compartment, but as previously discussed, the traditional cushion member of an airbag, which is the portion impacted by a vehicle occupant, must be mounted some distance from a passenger, because the airbag requires space to inflate. This distance constraint further limits the available overhead locations for installation of frontal airbag systems. Accordingly, a need also exists for a thin overhead airbag module.

Yet another disadvantage is that previously known airbags are somewhat expensive to produce and install. For example, each airbag is typically a single-use device that includes an inflation device, a monitoring device, an inflatable airbag cushion and a support structure. These individual components are typically specialized for use in the airbag and are thus relatively more expensive than off the shelf components. Furthermore deployment of the airbag typically ends the usefulness of the unit and if the vehicle is still useable, requires airbag replacement. Additionally, deployment often requires the airbag to break through tear seams in the steering wheel or instrument panel. Thus, replacement of the airbag also requires replacing the damaged instrument panel or steering wheel cover further increasing the installation cost. Accordingly, a need exists for an airbag module with reduced replacement costs.

The typical deployment mechanisms used in available airbags create other disadvantages. For example during normal operation, the monitoring device of the airbag will detect irregular acceleration or deceleration and activate the inflation device. The inflation device is typically either a pyrotechnic or gas inflator that quickly introduces filler material, such as expanding gases, into the airbag cushion. The need for fast inflation rates can increase the risk that the filler material is introduced into the airbag too fast, causing the airbag to over inflate and break. Traditionally, inflation via the introduction of filler materials pushes the inflatable airbag cushion out of the airbag support structure. Unfortunately, an inflation process that pushes the inflatable airbag out of the support structure can also damage the inflatable airbag cushion if the cushion gets caught against the support structure or another sharp edge. Occasionally, the inflatable airbag cushion is improperly packaged within the support structure or is punctured as it pushes through the support structure during deployment. The result in either case is an improper or unsuccessful deployment of the airbag, which may result in injury to the occupant. What is needed is a deployment mechanism that avoids pushing the inflatable airbag cushion out of the support structure.

SUMMARY OF THE INVENTION

The apparatus of the present invention has been developed in response to the present state of the art, and in particular, in response to the problems and needs in the art that have not yet been fully solved by currently available airbags. Thus, it is an overall objective of the present invention to provide a thin overhead airbag solution.

To achieve the foregoing objective, and in accordance with the invention as embodied and broadly described herein in the preferred embodiment, a thin overhead airbag apparatus configured to protect occupants of a vehicle from impact is provided. The thin overhead airbag apparatus includes a compressible housing assembly, an inflatable airbag cushion, and an inflator. The housing assembly holds the airbag cushion prior to deployment and more importantly is configured to be installed in the roof space of a vehicle. Typically this space is less than 40 mm thick, which would limit the size of airbag that could be used in conjunction with the apparatus. Fortunately, the housing assembly is compressible allowing a larger airbag cushion to be packaged within the apparatus. The stepped geometry of the compressible housing assembly allows for post-assembly compression without pinching the cushion that is packaged within. In one configuration, compression reduces the available packaging volume within the housing assembly by at least 20%. Compression may also provide the housing assembly with integrated rivets that are created during compression. Prior to compression the housing assembly may consist of an upper housing and a deformable lower housing. The inflatable airbag cushion is attached along the leading longitudinal edge to the compressible housing assembly. The inflator is in fluid communication with the cushion, the inflator providing an inflation force upon impact.

According to one configuration, the thin overhead airbag apparatus may further include an inflatable airbag cushion that is pulled from the housing during deployment. During deployment, the thin overhead airbag apparatus first inflates the cushion substantially parallel to the windshield. The cushion, which descends from the header or frame member of the vehicle to cover a majority of the area between the occupant and the front of the vehicle interior, first appears much like a curtain covering the front vehicle window or windshield. The first inflated section of the airbag cushion pulls the non-inflated portion of the cushion from the housing assembly. Once the inflatable airbag cushion has been completely pulled from the housing, the cushion begins expanding towards the expected occupant position. This inflation process provides better OOP protection by protecting the occupant from impact with the front window, flying shards of glass, and other projectiles. The overhead airbag may also help to keep the OOP occupant inside the vehicle during an endover or hard stop/frontal collision rollover accident. The secondary inflation expands towards the expected occupant position. As such, the thin airbag apparatus further protects an OOP occupant, because the secondary inflation pushes the OOP occupant back to the position where most safety constraints are directed.

Alternatively, the compressible housing may also include a deformable guide structure. This guide structure provides a deployment opening for the airbag cushion. The guide structure directs the initial inflation of the airbag cushion, so that the cushion inflates in a manner substantially parallel to the windshield. One configuration allows the guide structure to become deformed during deployment. The deformed guide structure becomes wider so that the cushion can be quickly pulled from the housing assembly.

These and other objects, features, and advantages of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained will be readily understood, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The presently preferred embodiments of the present invention will be best understood by reference to the drawings, wherein like parts are designated by like numerals throughout. It will be readily understood that the components of the present invention, as generally described and illustrated in the figures herein, could be arranged and designed in a wide variety of different configurations. Thus, the following more detailed description of the embodiments of the apparatus, system, and method of the present invention, as represented in FIGS. 1A through 8B, is not intended to limit the scope of the invention, as claimed, but is merely representative of presently preferred embodiments of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment.

Furthermore, the particular features, structures, or characteristics may be combined in any suitable manner in one or more embodiments. In the following description, numerous specific details are provided, such as examples of inflatable airbag cushions, various inflator gas delivery systems, different airbag folding and inflation methods, airbag container modules, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "airbag" or "cushion" means an inflatable mechanism used to cushion the vehicle occupant against impact with interior vehicle surfaces. Generally, these inflatable mechanisms are rapidly filled with a suitable filler medium, such as gas, and act as a passive vehicle occupant restraint system. The cushion may be composed of textile material, such as a thin nylon fabric.

Reference throughout this specification to "inflator" or "filler actuator" means devices used to quickly and forcefully introduce a filler material, such as expanding gases, into an inflatable airbag cushion. The inflator is typically either a pyrotechnic or gas inflator. Once triggered, the inflator uses compressed gas, solid fuel, or a combination thereof to produce the rapidly expanding gases necessary to inflate the airbag cushion. An exemplary nitrogen gas inflator generates nitrogen gas from the chemical reaction between sodium azide and potassium nitrate. The inflator may be installed within the airbag module, or be otherwise operably connected to the airbag cushion such that gas generated by the inflator inflates the airbag cushion during an accident.

A "remote inflator" is often used with a conduit, or "gas guide," to convey expanding gases to the airbag cushion. The remote inflator is not directly connected to the overhead airbag module and as such may be located in various locations including the support columns. Typically, an inflator needs to generate between about 2.0 moles and about 5.0 moles of gas to fill a typical full size passenger cushion. More preferably, the inflator generates between about 3.0 moles and about 4.0 moles of gas to inflate a full sized front passenger airbag cushion. In one preferred embodiment, the inflator introduces 3.5 moles of rapidly expanding gas into the thin overhead airbag cushion. Accordingly, the size and length of the inflator can be adjusted according to the desired gas output. For example, when using a nitrous based inflator to generate 3.5 moles of gas the following exemplary inflator diameter and length configurations would satisfy the design constraints: 30 mm diameter and 571 mm length, 35 mm diameter and 411 mm length, and 40 mm diameter and 315 mm length. As can be seen both the length and diameter of the inflator may be adjusted according to available space in the vehicle roof and desired quantity of filler material to be generated. As the overhead installation location typically provides abundant cross-car space in a lateral direction but limited thickness in transverse direction within the header or roof area of the car, thus the inflators of the present invention are typically longer and exhibit a smaller diameter than traditional inflators.

Reference throughout this specification to "vehicle" or "car" is a means of conveyance for carrying or transporting someone or something. More specifically it is a device or machine capable of movement with or without occupant assistance. Exemplary vehicles that may employ the present invention include automobiles, trucks, vans, buses, trains, planes, boats, and other means of transportation. These vehicles typically have a passenger environment that includes an expected occupant position, such as sitting in a car seat with a seat belt. The passenger environment may also include various interior surfaces, such as a steering wheel, an instrument panel or dashboard, a windshield, the doors, the floor, and the roof of a vehicle. Passive restraint devices, such as airbag systems, are typically intended to prevent the vehicle occupant from contact with one of the interior surfaces during an accident.

Figure 1A:
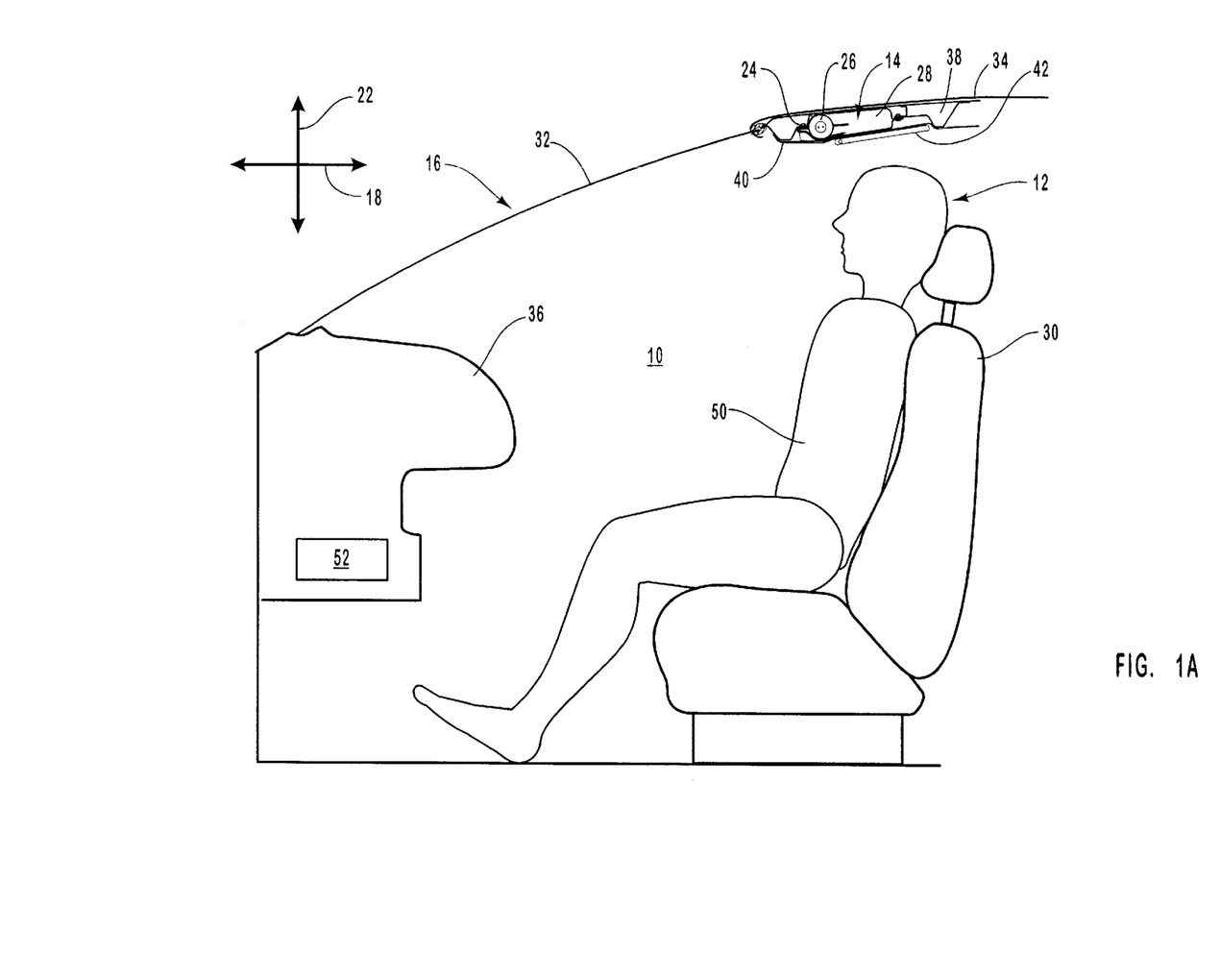
FIG. 1A is a vehicle cross-section view of the thin airbag module that provides a suitable operating environment for one embodiment of the present invention.

Reference is first made to FIG. 1A, a side view of a passenger environment 10 for an occupant 12 in which the present invention may be utilized or implemented. The present invention provides a passive restraint system within the passenger environment to protect the occupant 12. The passive restraint system includes a thin overhead airbag module 14 installed in a vehicle 16 to reduce or eliminate the force of an impact. The vehicle 16 is equipped with at least one thin airbag module 14. The passenger environment 10 may have a longitudinal direction 18, a lateral direction 20 (See FIG. 4), and a transverse direction 22.

Figure 1B:
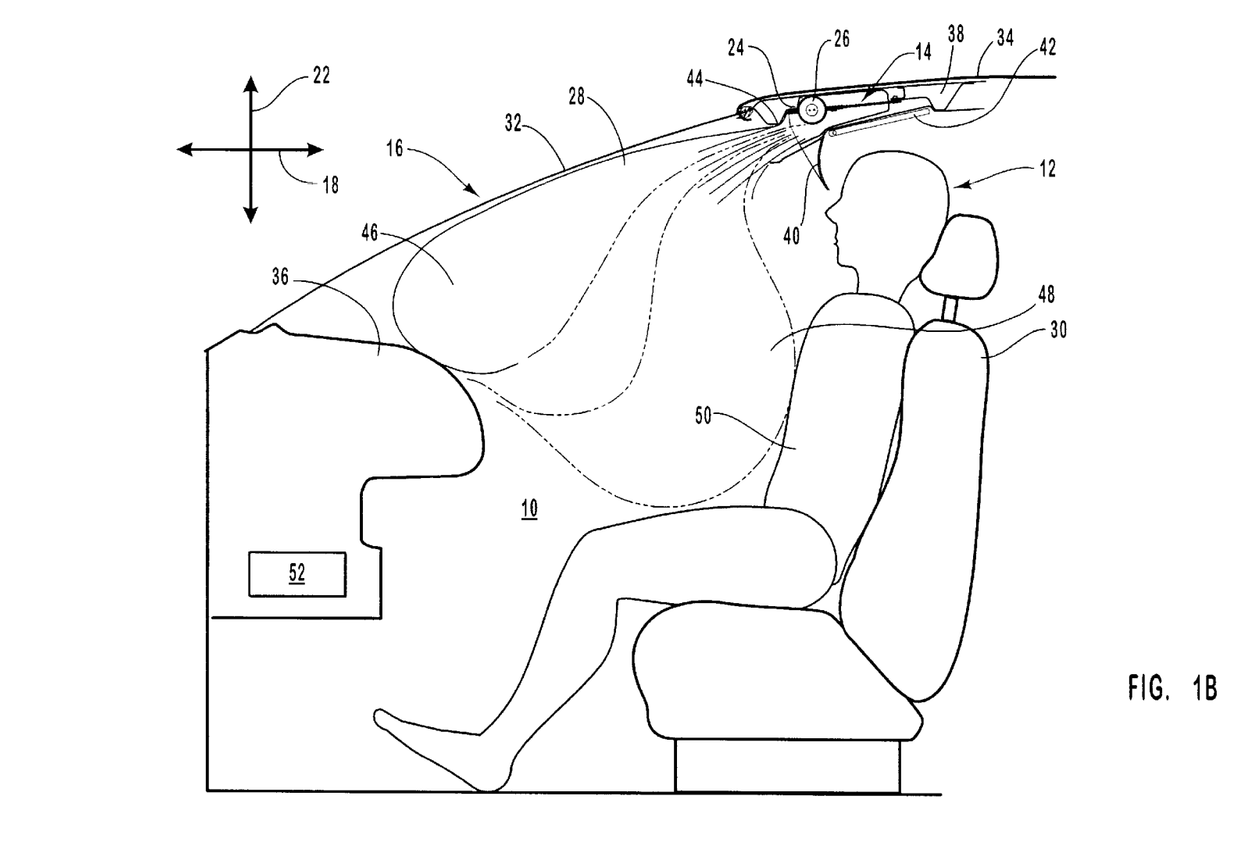
FIG. 1B is a vehicle cross-section view of the thin airbag module installation location and deployment behavior relative to occupant.

The overhead airbag module 14 includes housing assembly 24, an inflator 26, and at least one inflatable airbag cushion 28. The vehicle 16 includes among other things a car seat 30, a windshield 32, a roof 34, and an instrument panel 36. The roof 34 includes support ribs 38, headliner 40, and sun visor 42. The preferred environment for the present invention allows the thin overhead airbag module 14 to be placed within the roof 34 such that the airbag cushion 28 deploys out of the headliner 40 between the sun visor 42 and the windshield 32 as illustrated in FIG. 1B.

Generally, the thin airbag module 14 is affixed to at least one roof support rib 38 interspersed within the roof 34. The first roof support rib 38 is the header rib 44, which supports and connects the windshield 32 to the roof 34. Often the sun visor 42 is longitudinally positioned in the vicinity of the header rib 44. The headliner 40 is longitudinally positioned between the windshield 32 and the sun visor 42. As the thin airbag module 14 is also affixed to the header rib 44, it may be easily concealed above the headliner 40 and the sun visor 42 without the unaesthetic tear seams required by traditional instrument panel installations. The thin airbag module 14 is configured to compactly fit in the overhead position without significantly altering the roof thickness or support structure design.

The passenger environment 10 within the vehicle 16 is further depicted as having an expected occupant position 50 as occupied by the occupant 12. Typically the expected occupant position 50 is generated using average passenger environmental statistics to predict positioning of occupant 12 within the passenger environment 10 of the vehicle 16. These statistics include important spatial and weight details, such as possible car seat 30 locations, average passenger weight and height, and expected seat belt operation during an accident.

An electronic control unit (ECUT) 52 usually installed in the middle of an automobile, between the passenger and engine compartments, uses these statistics to determine if the vehicle is in an accident situation. During normal operation, one or more thin overhead airbag modules may be connected to the ECU 52. The ECU 52 includes a sensor, which continuously monitors the acceleration and deceleration of the vehicle and sends this information to a processor, which processes an algorithm to determine if the vehicle is in an accident situation. A modem ECU 52 may integrate occupant related statistics into the algorithm to determine the response necessary during an accident situation. When the processor determines that there is an accident situation, the ECU 52 transmits an electrical current to initiator contacts 66 (FIG. 2) on the inflator 26 of the thin airbag module 14.

FIG. 1B is a side view illustrating a deployed thin overhead airbag cushion within the passenger environment 10. Specifically, FIG. 1B helps illustrate both the initial inflation/deployment region 46 and the secondary deployment region 48 with regard to the expected occupant position 50. After the initiator 66 (FIG. 2) triggers operation of the inflator 26 or gas generator, which in some embodiments uses a combination of compressed gas and solid fuel, the activated inflator 26 generates an inflation force. The inflation force deploys the textile airbag cushion 28. The airbag cushion 28 is initially directed out of the thin airbag module 14 inflating in a direction substantially parallel to the windshield 32 as indicated by the initial deployment region 46. This inflation process provides better protection to the occupant 12 from impact with the front window 32 or flying shards of glass and other projectiles. The initial deployment region 46 of the overhead airbag cushion 28 may help keep the occupant 12 inside the vehicle during an endover or hard stop/frontal collision rollover accident. The secondary deployment region 48 allows the airbag cushion 28 to impact the occupant 12 and prevent injury to the occupant 12. In some airbag apparatuses, the airbag cushion 28 may be fully inflated within 50 thousandths of a second and deflated within two tenths of a second.

As previously discussed, the thin overhead airbag module 14 includes an inflator 26. The inflator 26 may be pyrotechnic, or gas. In a preferred configuration, the inflator 26 is attached to both the housing assembly 24 and the airbag cushion 28. This combination increases the modularity and reliability of the thin overhead airbag module 14 by keeping the essential components in close proximity to each other. Reducing the risk of inflation channel interference from accident debris increases module reliability.

To be stored in the roof of a vehicle, the inflator 26 must maintain a profile less than the thickness of the roof, which is typically at least about 40 mm. As such the preferred diameter of the inflator 26 should be less than about 40 mm. Due to abundant lateral cross-car space available in the roof 34 or header area, the inflator design may use longer, small diameter inflators 26. This enables the inflator diameter to vary according to the available lateral length in the roof. For example, all of the following nitrous based inflator cylinders dimensions could produce 3.5 moles of gas at the preferred inflation force: 30 mm diameter by 571 mm long, 35 mm diameter by 411 mm long, and 40 mm diameter by 315 mm long.

The inflator 26 generally supplies between about 2.0 moles and 5.0 moles of gas for inflation of the airbag cushion 28. More preferably, the inflator 26 supplies between about 3.0 moles and about 4.0 moles of gas for inflation of a full sized front airbag cushion, and still more preferably the inflator 26 supplies between about 3.4 moles and 3.6 moles of gas. One preferred embodiment of the inflator 26 provides about 3.5 moles of gas for inflation of the airbag cushion 28.

With some embodiments of the overhead airbag module 14, a remote inflator is used with a conduit, tube, or "gas guide," to convey expanding gases to the airbag cushion 28. As such, the gas guide is in fluid communication with the airbag cushion 28. The inflator 26 used in a remote inflation embodiment may be located outside of the thin airbag module, and is not necessarily constrained by the thickness or diameter requirements previously discussed. For example, the inflator 26 could be placed into the support columns or pillars of the car used to support the roof. Other exemplary inflator locations include within the motor cavity of the vehicle, a central roof area, a centralized inflator location, and similar protected locations.

Figure 2:
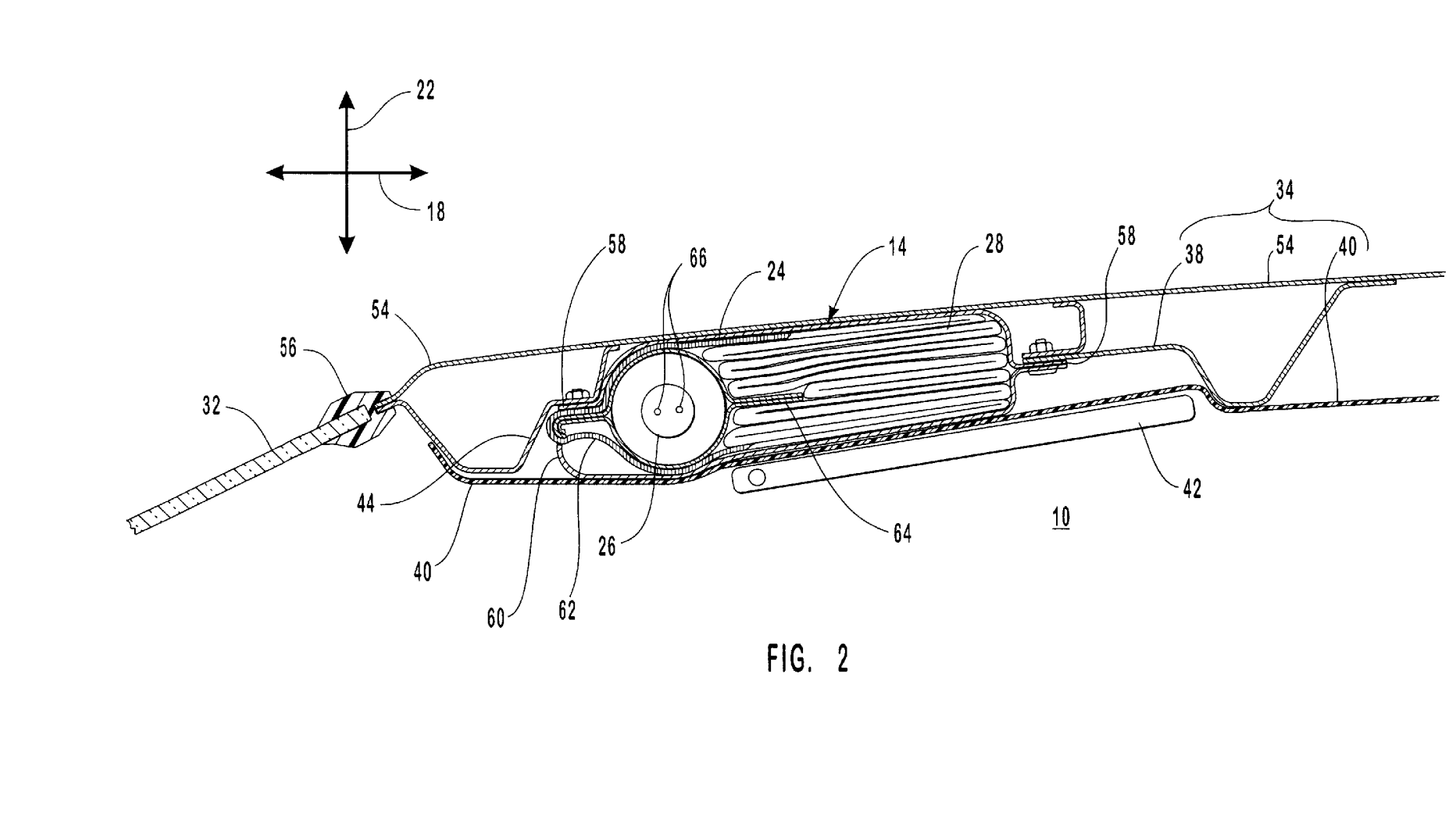
FIG. 2 is an enlarged cross-section view of the installation location of the thin airbag module.

Reference is next made to FIG. 2 illustrating a cross-sectional view of the thin airbag module 14 installed within the roof of a vehicle. The thin overhead airbag module 14 comprises the housing assembly 24, the inflator 26, and the inflatable airbag cushion 28. The inflatable airbag cushion 28 is compressed within the housing assembly 24. The thin overhead airbag module 14 is positioned within the roof 34 near a fastener ridge 56 to the windshield 32, or more specifically, longitudinally behind the header rib 44. The thin overhead airbag module 14 is transversely positioned below the roof skin 54 and above the headliner 40. In one embodiment, the sun visor 42 is affixed below the thin airbag module 14 so as to be less detectable to the occupant during normal operation.

The housing assembly 24 includes a mounting flange 58 that enables the thin airbag module 14 to be fastened to roof support rib 38 and header support rib 44. The housing assembly 24 also includes a deformable deployment guide 60, which directs the initial inflation force and deployment of the inflatable airbag cushion 28. Upon activation of the inflator 26, the generated gas is fed into an initial inflation rib 62 of the inflatable airbag cushion 28. The initial inflation rib 62 is a leading longitudinal edge of the inflatable airbag cushion 28 and runs from the car forward mounting flange under the inflator 26 into the compressible packaging section within the housing assembly. The initial inflation rib 62 is fastened to the housing assembly 24 near the deformable cushion deployment guide 60 such that upon inflation the initial inflation rib 62 pulls the remaining inflatable airbag cushion 28 from the housing assembly 24. Diffuser 64 helps redirect filler material from an activated inflator 26 so that the inflatable airbag cushion 28 is not damaged during inflation. The diffuser 64 also helps position the inflator 26 within the housing assembly 24. One diffuser configuration provides mounting orifices that can be affixed to the housing assembly 24. Another is clamped to the housing assembly 24.

Figure 3:
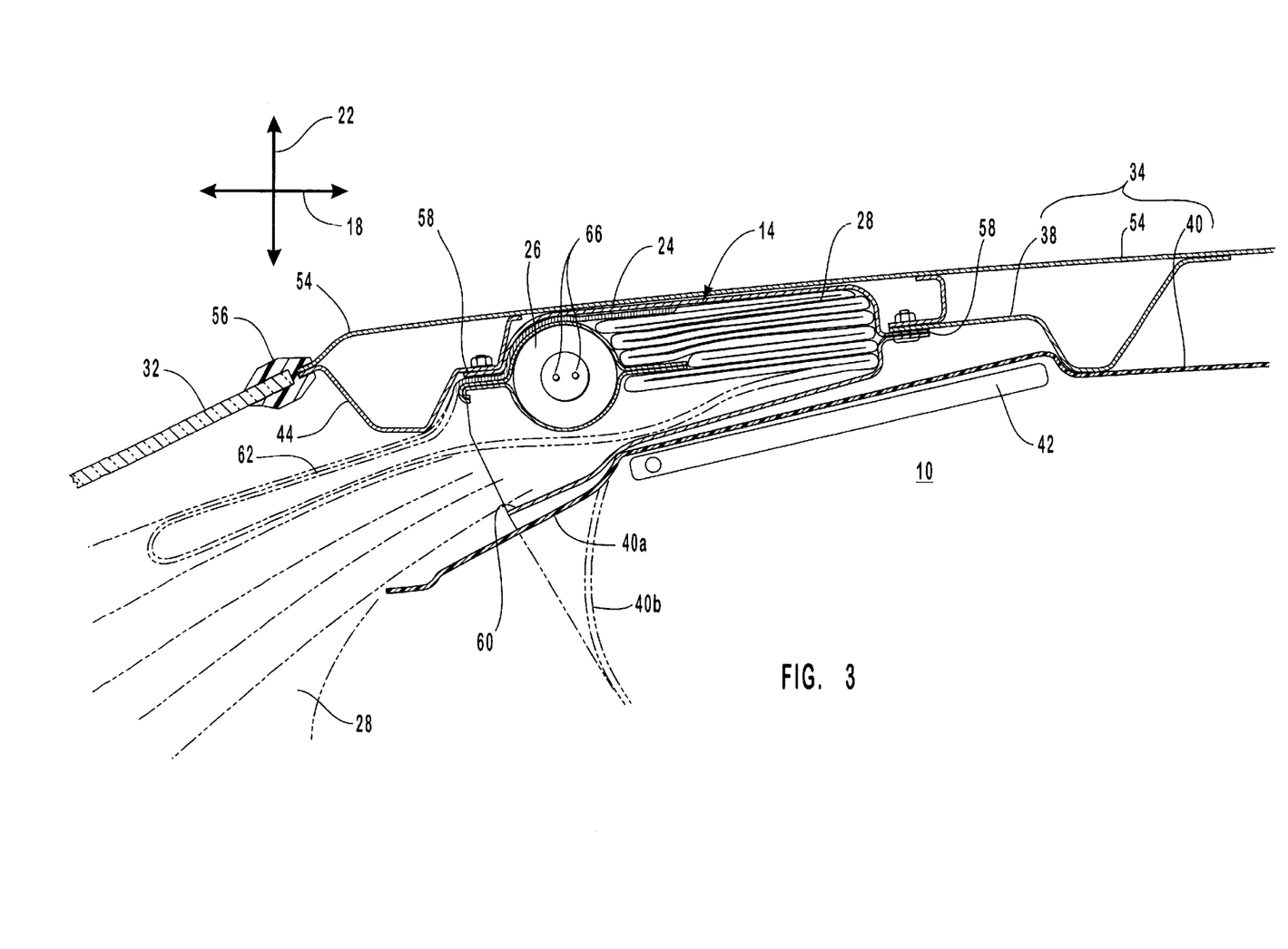
FIG. 3 is an enlarged cross-section view of the thin airbag module during deployment.

Initiator contacts 66 on the inflator 26 may be electrically connected to the vehicles ECU system and are activated upon detection of impact conditions. Upon activation of the initiator contacts 66, the inflator 26 supplies the filler material to the initial inflation rib 62 which initially inflates as guided by the deformable cushion deployment guide 60. As the inflator continues to generate gas the initial inflation rib pulls the remainder of the inflatable airbag cushion 28 from the housing assembly 24 in a substantially parallel direction with the windshield 32 as illustrated in FIG. 3. During the course of deployment the inflatable airbag cushion 28 may deform the deployment guide 60 of the housing assembly 24. This enables the cushion 28 to be deployed faster and reduces the risk of tearing the airbag cushion 28.

FIG. 3 is an enlarged cross-sectional view of the thin airbag module 14 during deployment. Thin airbag module 14 is positioned within the roof 34 of the vehicle. Upon detection of impact, an activating signal is sent to the initiator contacts 66. The initiator contacts 66 in turn activate an explosion of gas or filler material from the inflator 26. The inflator material inflates the initial inflation rib 62 which follows the deformable deployment cushion guide 60 and separates the headliner 40 from the header rib 44 and bends the headliner 40 to an initial position 40a. As the inflation force from the inflator 26 is applied to the leading longitudinal edge of the inflatable airbag cushion 28, the initial inflation rib 62 pulls the remainder of the airbag cushion 28 into the passenger environment 10 from within the housing assembly 24. The initial inflation rib 62 of the inflatable airbag cushion 28 inflates in a manner substantially parallel to the windshield 32. The method of inflation in the substantially parallel position to the windshield is significant in a number of ways. First, standard airbag modules push the airbag out of the module often causing undo damage to the airbag during the deployment phase. Whereas the method employed by the present invention pulls the cushion from the housing, minimizing the risk of damage. During the initial inflation stage, pressure can develop within the inflatable airbag cushion 28 being pulled through the deformable deployment guide 60 such that the opening is pressed wider. This deformation allows the cushion to be quickly removed from the housing assembly without damage. Second, the inflation force is initially directed away from the expected occupant position in the substantially parallel direction to the windshield. By directing the initial inflation force away from the expected occupant position, there is less risk of the cushion causing a contact injury to the occupant. Furthermore, this protects the occupant, because it covers the front window to keep the individual within the vehicle and debris out.

Once the remainder of the inflatable airbag cushion 28 is pulled from the housing assembly 24, a secondary inflation direction occurs in the direction of the expected occupant position. This secondary expansion bends the headliner 40 to a secondary position illustrated by 40b. The secondary inflation force then protects the individual from contact with the instrument panel 36.

Figure 4:
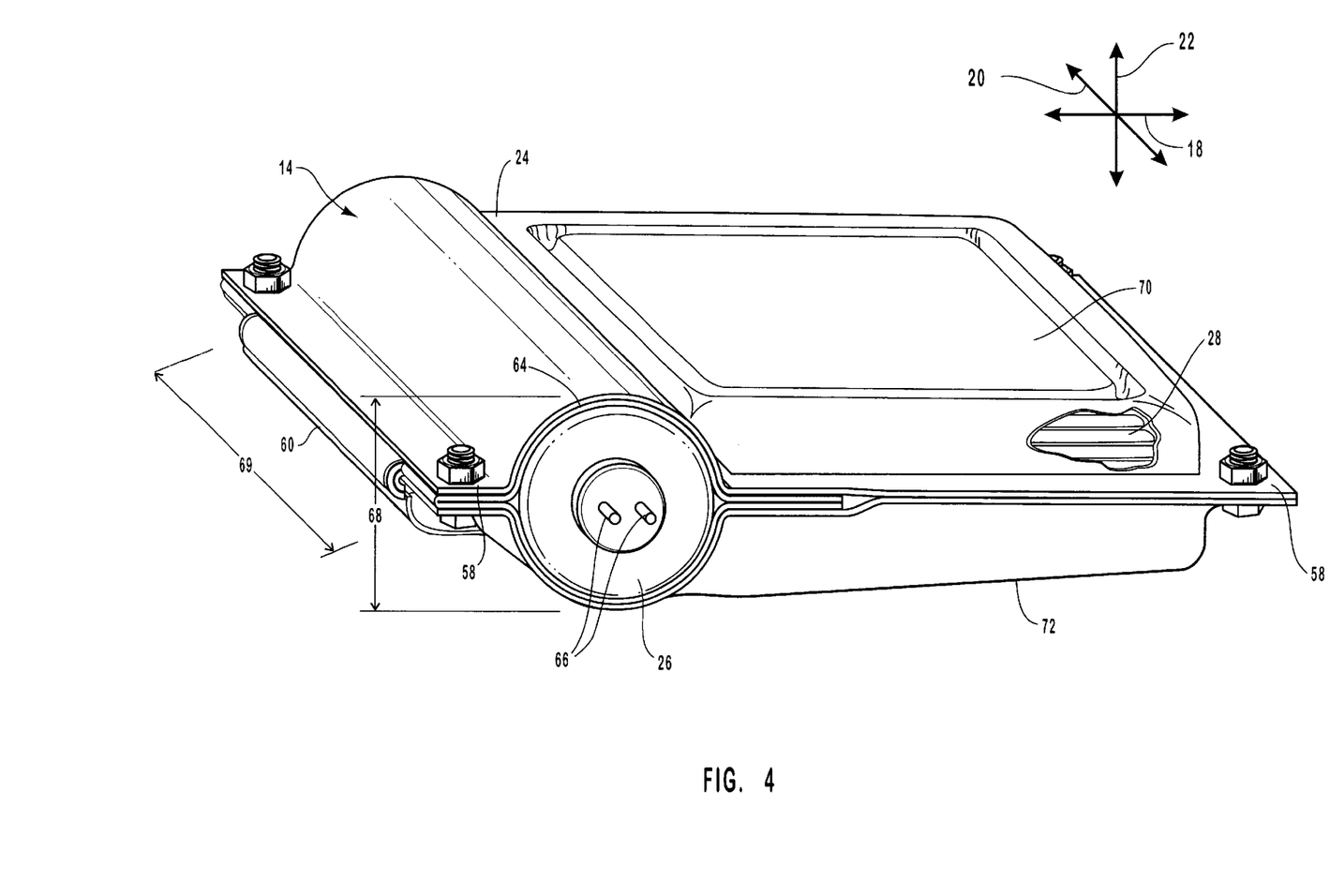
FIG. 4 is a perspective view of the thin airbag module.

FIG. 4 is a perspective view of one embodiment of the thin airbag module 14. The thin airbag module includes housing assembly 24, inflator 26, and inflatable airbag cushion 28. The housing assembly 24 further includes at least one mounting flange 58 configured to be mountable to the support ribs within the roof of a vehicle. The housing assembly 24 also includes a deformable deployment guide 60 that regulates the direction of the initial inflation. The inflator 26 further includes a diffuser 64 that is also attached to the inflatable airbag cushion 28 and directs the inflation force into the leading longitudinal edge. Upon receiving an activation signal at the initiator contacts 66, the inflator 26 releases or generates a gas or filler material which is directed by the diffuser 64 into the initial inflation rib 62 of the airbag cushion 28. The diffuser 64 also positions the inflator 26 within the housing assembly 24.

Just as with the inflator, the longitudinal 18, lateral 20, and transverse 22 dimensions of the overhead module may also be modified according to the available space in the roof cavity. The roof cavity is defined as the space within the roof defined by the roof skin, the support ribs, and headliner of the vehicle. The illustrated housing assembly 24 has a transverse measurement 68 of about 30 millimeters to about 40 millimeters enabling the thin airbag module to be positioned within the roof of a vehicle. The overhead location of the inflatable airbag cushion allows for a longer lateral dimension to the airbag module than is allowable within the instrument panel. As such the lateral measurement 69 of the airbag module may include inflator modules between about 200 millimeters and about 600 millimeters in width. The depth of the given airbag module is somewhat constrained by the positioning of the support ribs within the roof. An acceptable depth or longitudinal measurement could be between about 100 millimeters and about 200 millimeters.

Figure 5:
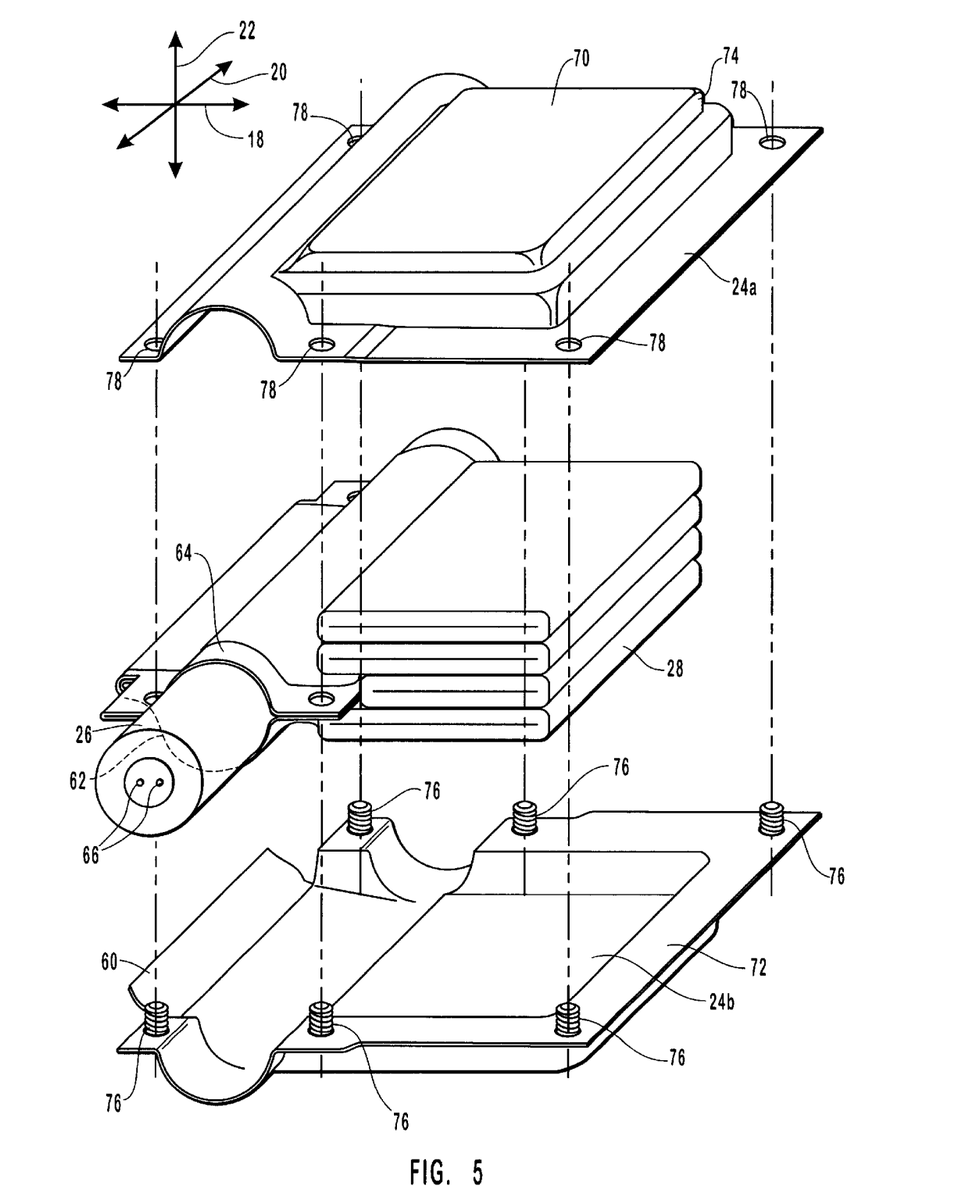
FIG. 5 is an exploded perspective view of the thin airbag module assembly.

FIG. 5 is an exploded isolation view of a thin airbag module. The thin airbag module includes an inflator 26 in fluid communication with an inflatable airbag cushion 28 within a compressible two piece housing assembly 24a & 24b. The compressible housing assembly 24a & 24b having an upper housing 70 and a lower housing 72. The upper housing 70 further includes a compressible expanded section 74. The lower housing 72 includes deformable deployment guide 60 and multiple threaded guideposts 76 for properly positioning the housing assembly 24 together. Upon assembly, each threaded guidepost 76 is inserted through a positioning orifice 78 in the upper housing 70. Nuts are threaded onto the guideposts 76 to fasten the upper housing 70 and lower housing 72 together. Alternatively, the guideposts 76 may be compressible. Upon compression the compressible guideposts 76 are compressed or crimped into rivets fastening the upper housing 70 and lower housing 72 together. Alternative configurations use clamps, nuts and bolts, or other fasteners to fixably attach the two housing components together.

The housing assembly 24 also illustrates a stepped geometry, which allows for post assembly compression without pinching the inflatable airbag cushion 28 stored within the compressible expanded section 74. Normally the housing assembly is constructed from strong material, which does not deform during the deployment stage of the airbag cushion. Exemplary materials include light non-ferrous metals, injection molded thermoplastic, mild stamped steel, stamped aluminum, or combination thereof. One embodiment of the present invention allows for the housing assembly to deform according to the applied inflation pressure. Specifically, the deformable housing enlarges the opening of the deployment guide 60 upon application of the inflation force to the airbag cushion 28. This deformation may either be permanent or temporary in nature, depending on the material used to construct the housing assembly. By deforming the housing assembly, the larger opening allows for the inflatable airbag cushion to be deployed faster.

Generally, the inflator 26 is fixably attached to a portion of the textile bag used as the inflatable airbag cushion 28. Traditionally, folding is important because it helps determine how the airbag cushion 28 will behave during inflation. As such the airbag may be folded to avoid hitting occupants during inflation or to inflate in a certain direction. Exemplary folding methodologies include accordion style, rolled, compressed. Despite the different methodology used to deploy the airbag cushion 28 in the present invention, folding techniques may still be applied to improve the overall performance of the thin overhead airbag module 14. However, one should consider the impact of compression on the packaging.

Typically, applying some type of fastener to the airbag cushion 28 makes the connection. However, doing so generally requires the inflator 26 to include a diffuser 64. In FIG. 5, the diffuser 64 is attached to the initial inflation rib 62 of the airbag cushion 28. Gas, which fills the airbag cushion 28 is generated by the ignition of gas generant within the inflator 26 by a signal received by the initiator contacts 66. Generally, the gas is created from the rapid burning of pyrotechnic materials. The gas or exhaust escapes via exit ports in the inflator 26 at a high velocity and temperature. Due to the limited space in the thin airbag module 14, the airbag cushion 28 is generally stored by folding it up against the inflator 26. Without the diffuser 64, the hot gas would be concentrated on the textile fabric of the airbag cushion 28. The concentrated hot gas and the confined space may combine to cause the gas to burn one or more holes in the airbag material, which is generally a nylon or polyester weave. These holes would cause the airbag cushion 28 to inflate improperly.

The diffuser 64 disperses the exhaust. Dispersing the gas allows the gas to expand and cool. The diffuser 64 may also include a conductive surface, which further allows the gas to transfer some of its heat. The diffuser 64 may also be used to direct the gas leaving the exit ports. For example, gas may be directed to cause the airbag cushion 28 to inflate in a particular manner. Once the gas passes through the diffuser 64, the gas is sufficiently cooled and/or not concentrated to prevent burning holes in the textile material of the airbag cushion 28.

The diffuser 64 may be built as part of the body of the inflator 26. Generally, doing so adds to the production and design costs of the inflator 26. When the diffuser 64 is incorporated into the body of the inflator 26, this may require custom fabrication of inflator bodies for different vehicles. Custom fabrication is also expensive. Alternatively, separate parts may be secured to the inflator 26 at appropriate points to function as diffusers and to direct the exhaust gas. The diffuser 64 may also help to properly position the inflator 26 within the thin airbag module 14.

Other connection configurations that do not use a diffuser 64 between the inflator 26 and cushion 28 exhibit inflation characteristics that must be considered in the overall design of the module. For example, in the case of the remote inflator using a gas guide, the gas guide may be inserted through an opening in the airbag cushion 28, and then the surrounding textile bag fabric may be tightened around the gas guide through the use of a clamp or other mechanical fastener. Such fasteners may cause a number of problems. First of all, the fastener must hold the fabric of the airbag cushion 28 very tight around the gas guide to avoid gas leakage. Such a tight fitting is difficult to form, especially when the airbag fabric must be bunched and folded around the tubular gas guide. As a result, failed attempts at fastening the gas guide to the airbag cushion 28 may result in unnecessary reassembly and scrapping of materials.

Figure 6:
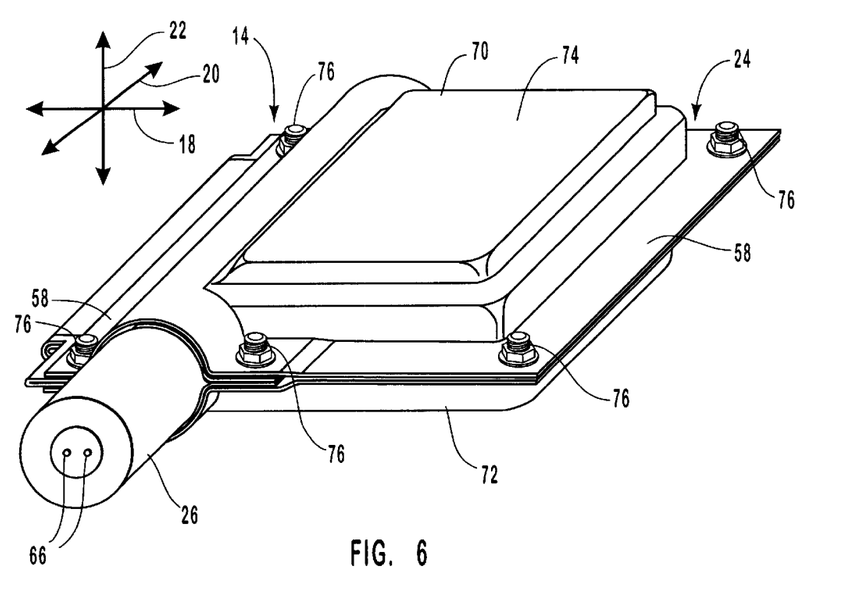
FIG. 6 is a perspective view of the airbag module assembly before post assembly compression.

FIG. 6 illustrates a thin overhead module 14 prior to post-assembly compression of the housing assembly 24. Notably, the available packaging volume is increased within at least one of the upper housing 70 and the lower housing 72 via a compressible expanded section 74. The illustrated housing assembly 24 also exhibits a stepped geometry in the upper housing assembly 70. The inflator 26, airbag cushion 28 (not shown), mounting flanges 58, deformable deployment guide 60, and initial inflation rib 62 are positioned within the thin overhead module 14 prior to compression. For example, the upper housing 70 and lower housing 72 are selectively fixably positioned due in part to the threaded guideposts 76 and fasteners therefor. The guideposts 76 align and position the inflator 26 within the thin overhead module 14. The guideposts 76 also facilitate containment of the airbag cushion 28 within the packaging cavity of the thin overhead module 14. While FIGS. 2–7 illustrate threaded guideposts, one skilled in the art would recognize that various other fasteners could be used without detracting from the scope of the present invention. For example, the thin overhead module 14 could use clamps, rivets, adhesive glue, tape, or combination thereof. Alternatively, the guideposts 76 may also include a compressible variation, wherein the guideposts are crimped into rivets.

Figure 7:
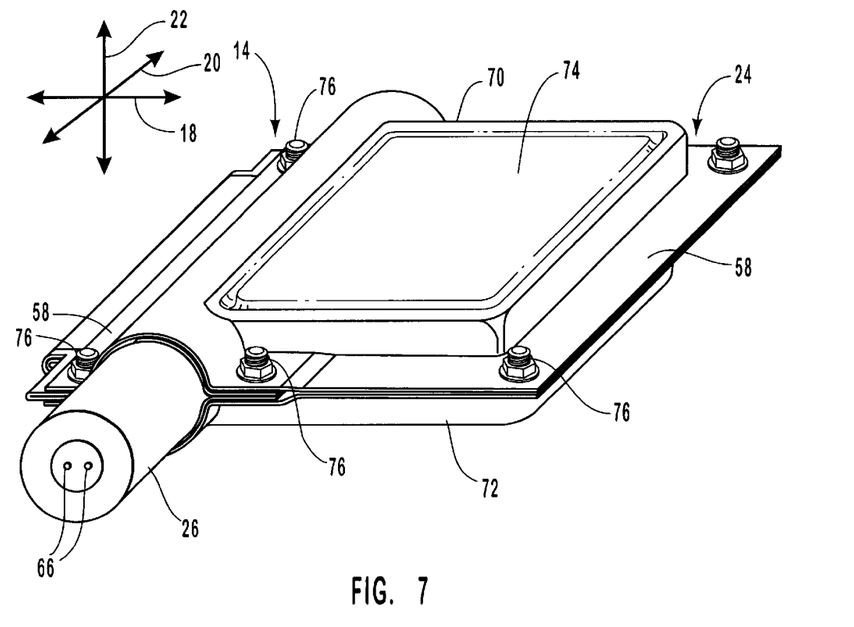
FIG. 7 is a perspective view of the airbag module assembly after post assembly compression.

FIG. 7 illustrates the thin overhead airbag module 14 after compression. The compressible expanded section 74 is compressed so that the profile of the thin overhead module 14 fits within the confines of the roof 34 (FIG. 1 A). As mentioned previously, this typically requires that the thin overhead module have a transverse profile that is less than about 40 mm. As would be clear to one of skill in the art, the transverse profile can be increased and decreased according to the available space in the target vehicle.

Compression of the cushion 28 (FIG. 2) and housing 24 after assembly provides several advantages over available airbag modules. For example, post-assembly cushion compression reduces the need to tightly fold the airbag cushion 28 prior to assembly. Compression also allows larger full-sized front airbag cushions 28 to be packaged within the housing assembly 24. The stepped geometry in the upper housing 70 resists springback following compression. The compressed stepped geometry also prevents cushion pinching or binding, which would hinder successful deployment of the airbag.

In one embodiment, the positioning of the inflator 26 within the compressed thin overhead airbag module 14 forces the lower housing 72 to expand below the inflator 26 following reception of an activation signal at the initiator contacts 66. Once the housing assembly 24 is sufficiently expanded or deformed, the inflator 26 effectively pulls the compressed inflatable airbag cushion 28 out of the thin overhead airbag module 14 by quickly introducing filler material, such as expanding gases, into the airbag cushion 28.

Figure 8A:
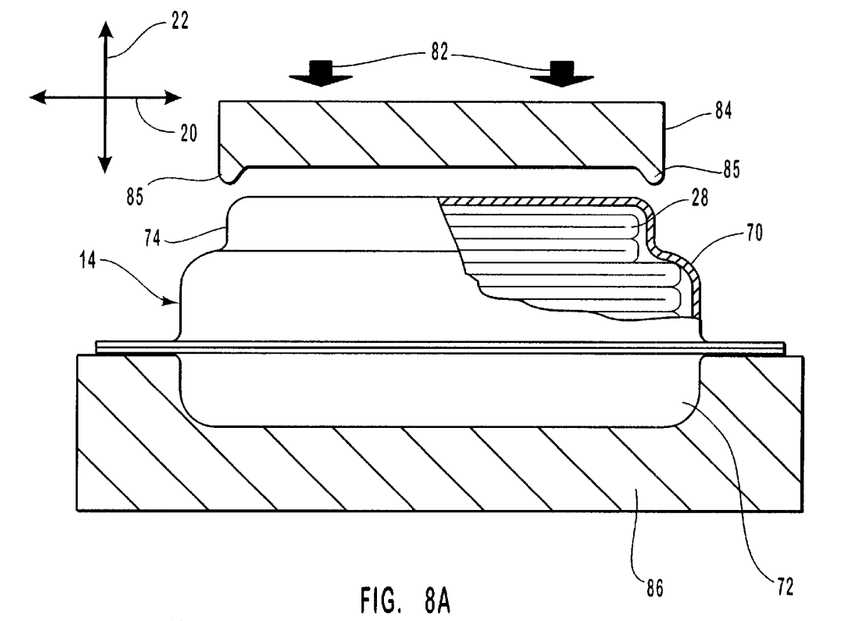
FIG. 8A is a cross-sectional side view of the thin airbag module prior to compression.

FIG. 8A is a cross-sectional cutaway view of the thin airbag module 14 prior to compression. A compression force 82 is applied to the upper housing 70 of the thin airbag module 14 via an upper compression element 84. In addition to compressing the expanded section 74, the compression force 82 will also compress the inflatable airbag cushion 28 within the upper housing 70. The upper compression element is configured to couple with the stepped geometry of the upper housing 70, such that the compressible expanded section 74 fits within a pressure ridge 85 on the upper compression element 84. The pressure ridge 85 compresses the upper housing 70 along the stepped geometry such that the compressed upper housing 70 resists spring-back and prevents pinching the inflatable airbag cushion 28. The lower housing 72 is held in place by the lower compression element 86.

In one embodiment the lower housing 72 also contains an expanded section 74 and exhibits a stepped geometry. The lower compression element 86 in this embodiment would be configured in a manner similar to the upper compression element 84, such that upon application of the compression force 82 the expanded sections 74 in both the upper housing 70 and lower housing 72 would compress.

Figure 8B:
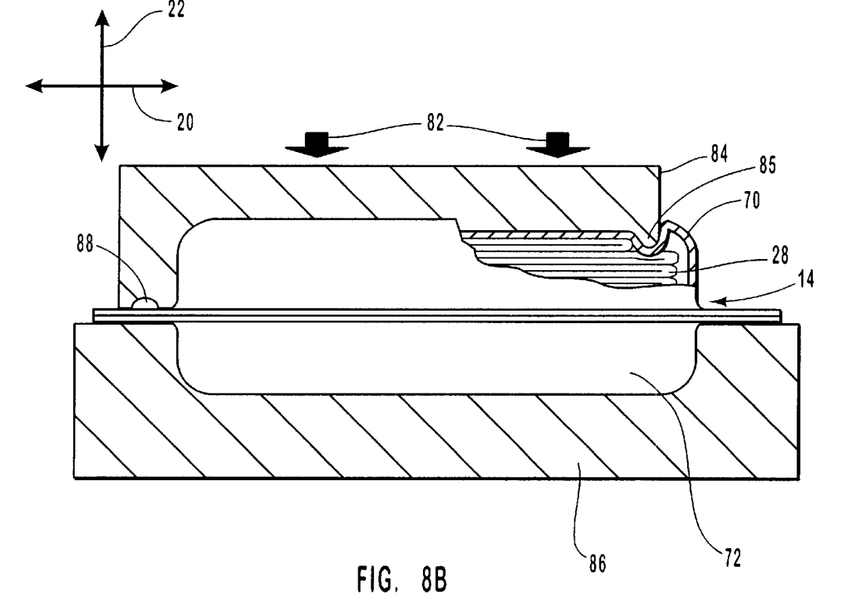
FIG. 8B is a cross-section view of the thin airbag module during the compression process.

FIG. 8B is a cross-section cutaway of the thin airbag module 14 during the compression process. The compression force 82 is applied to the upper compression element 84, which compresses the expanded section 74 of the upper housing 70 and the inflatable airbag cushion 28 within. The upper compression element 84 is coupled with the stepped geometry of the upper housing 70, such that the compressible expanded section 74 is compressed without pinching the inflatable airbag cushion 28. The compression force 82 creates a transverse profile that enables the thin overhead airbag module 14 to be mounted within the roof of a vehicle. The pressure ridge 85 on the upper compression element 84 compresses the upper housing 70 in a manner that resists spring-back, thereby ensuring that the thin overhead airbag module 14 will maintain its thin transverse profile. Compression of the expanded section 74 of the upper housing 70 may reduce the available packaging volume within the housing assembly 24 between about 40% and about 95% of the available uncompressed packaging volume. In a preferred embodiment, the volume of the compressible expanded section is reduced between about 20% and about 30%.

Coupling the upper housing 70 and lower housing 72 may also be performed during the compression process. For example, clips or clamps may be applied to the mounting flange while the upper housing 70 and lower housing 72 are subjected to the compression force 82. In one embodiment, the guideposts 76 are crimped during compression into integrated rivets 88 (FIG. 8B) that fasten the upper housing 70 and lower housing 72 together.

In summary, the present invention describes a thin compressible overhead airbag module that provides inflatable overhead passive restraint protection to out of position occupants within a vehicle. The flat airbag module is compressed following assembly, so that the compressed housing assembly is thin enough to be mounted in the roof, within the overhead space between the vehicle roof skin and the interior headliner. The compressible housing assembly provides substantially more packaging space, sufficient for a full sized front airbag cushion. The placement of the module in the roof allows the use of a longer, small diameter inflator. Upon activation of the inflator, the car forward location of the inflator relative to the inflatable cushion forces the housing to deform below the inflator. The inflation force generated by the inflator effectively pulls the inflatable cushion out of the airbag module and initially deploys substantially parallel to the windshield before inflating towards the expected occupant position.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

What is claimed and desired to be secured by United States Letters Patent is:

1. A thin overhead airbag apparatus configured to protect occupants of a vehicle from impact, the apparatus comprising:
    a compressible housing assembly comprising an upper housing and a lower housing, the compressible housing assembly having a compressed section which allows the housing assembly to be mountable within a roof of a vehicle;
    an inflatable airbag cushion attached along a leading longitudinal edge to the compressible housing assembly and packaged between the upper housing and lower housing such that the cushion is compressibly folded within the housing assembly; and
    an inflator in fluid communication with the cushion, the inflator providing an inflation force upon impact.

2. The apparatus as recited in claim 1, wherein the upper housing comprises the compressed section.

3. The apparatus as recited in claim 1, wherein the compressed section is configured to compress available packaging volume within the housing assembly by at least about 20%.

4. The apparatus as recited in claim 1, wherein the housing assembly has a thickness between about 30 mm and about 40 mm following compression of the compressed section.

5. The apparatus as recited in claim 1, wherein the inflation force is applied to the leading longitudinal edge of the cushion pulling the cushion from the housing assembly.

6. The apparatus as recited in claim 1, wherein the housing assembly has a stepped geometry that allows for post-assembly compression without pinching the cushion.

7. The apparatus as recited in claim 6, wherein the compressed step geometry of the housing assembly resists spring-back.

8. The apparatus as recited in claim 1, wherein orifices in the upper housing that receive guideposts from the lower housing facilitate proper alignment of the housing assembly.

9. The apparatus as recited in claim 8, wherein the guideposts are crimped during compression of the housing assembly into integrated rivets that fasten the upper and lower housing together.

10. The apparatus as recited in claim 1, wherein impact activates the inflator, the inflation force therefrom deploying the inflatable airbag cushion substantially parallel to a windshield of the vehicle.

11. The apparatus as recited in claim 1, wherein the inflator is a nitrous-based inflator.

12. The apparatus as recited in claim 1, wherein the inflator is in a car forward location.

13. The apparatus as recited in claim 1, wherein the inflator generates between about 3.0 moles and about 4.0 moles of gas.

14. The apparatus as recited in claim 13, wherein the inflator generates between about 3.4 moles and 3.6 moles of gas.

15. The apparatus as recited in claim 14, wherein the inflator generates about 3.5 moles of gas.

16. The apparatus as recited in claim 1, wherein the inflator is cylindrical having a diameter less than about 40 mm.

17. The apparatus as recited in claim 16, wherein the inflator is cylindrical having a diameter between about 30 mm and about 40 mm.

18. A thin overhead airbag system configured to protect occupants of a vehicle from impact, the system comprising:
    a housing assembly having a lower housing, an upper housing, and at least one compressed section which allows the housing assembly to be mountable within a roof of a vehicle;
    an inflatable air bag cushion positioned between the upper housing and the lower housing such that a portion of the cushion is within the at least one compressed section of the housing assembly; and
    an inflator in fluid communication with the inflatable air bag cushion.

19. The system as recited in claim 18, wherein the compressed section is configured to compress the available packaging volume by at least about 20% after the cushion is positioned within the housing assembly while leaving the cushion free to deploy upon inflation through a deformable deployment guide in the lower housing.

20. The system as recited in claim 18, wherein the at least one compressed section is configured to be compressed once the cushion is positioned in the housing assembly.

21. The system as recited in claim 20, wherein a transverse dimension of the housing assembly is between about 30 mm and about 40 mm once the at least one compressed section is compressed.

22. The system as recited in claim 18, wherein the at least one compressed section is compressed such that the housing assembly height is less than about 40 mm.

23. The system as recited in claim 22, wherein the housing assembly has a height between about 30 mm and about 40 mm following compression of the at least one compressed section.

24. The system as recited in claim 18, wherein the lower housing has a stepped geometry to form the at least one compressed section, the stepped geometry allowing compression of the compressed section free of springback.

25. The system as recited in claim 18, wherein the housing assembly is deformable upon impact allowing for more rapid cushion deployment.

26. The system as recited in claim 18, wherein the lower housing is constructed from a material selected from the group consisting of light non-ferrous metals, injection molded thermoplastic, mild stamped steel, and stamped aluminum.

27. The system as recited in claim 18, wherein the inflatable air bag cushion further comprises an uninflated state, an uninflated compressed state, an initial inflated state, a fully inflated state, and a deflated state.

28. The system as recited in claim 27, wherein the housing assembly is compressed to initiate the uninflated compressed state and a deformable deployment guide in the housing assembly is deformed by deployment of the inflatable air bag cushion during the initial inflated state.

29. The system as recited in claim 18, wherein a compressed packaging volume of the housing assembly is between about 40% and about 95% of an uncompressed packaging volume of the housing assembly.

30. The system as recited in claim 29, wherein compression of the compressed section reduces the available packaging volume within the housing assembly by between about 20% and about 30%.

31. The system as recited in claim 18, wherein the housing assembly further comprises a mounting flange for attachment to cross-car roof ribbing in the vehicle.

32. The system as recited in claim 31, wherein the housing assembly is configured to be attached to a cross-car roof rib located longitudinally between a windshield and a sun visor of the vehicle.

33. The system as recited in claim 32, wherein upon attachment of the housing assembly to the roof rib, the cushion initially deploys substantially parallel to the windshield following impact.

34. The system as recited in claim 18, wherein the inflator is positioned within the housing assembly and the cushion is folded and packaged longitudinally behind the inflator.

35. The system as recited in claim 34, wherein the inflator generates an initial forward longitudinal inflation force within a leading longitudinal edge of the cushion such that the inflated leading longitudinal edge of the cushion pulls the trailing cushion from the housing assembly.

36. The system as recited in claim 18, wherein the inflator is a pyrotechnic solid fuel inflator.

37. The system as recited in claim 18, wherein the inflator is a nitrous-based inflator.

38. The system as recited in claim 18, wherein the inflator provides between about 3.0 moles and about 4.0 moles of filler material.

39. The system as recited in claim 38, wherein the inflator provides between about 3.4 moles and 3.6 moles of filler material.

40. The system as recited in claim 38, wherein the inflator is cylindrical having a diameter less than about 40 mm.

41. A method of manufacturing a thin overhead airbag module for installation in a vehicle having an overhead space with a thin transverse profile, said method comprising:
   a. placing an inflator in fluid communication with at least one inflatable airbag cushion configured to protect occupants of a vehicle from impact;
   b. packaging the at least one airbag cushion into a compressible cavity within a housing assembly, the compressible cavity being formed by an upper housing member with a stepped geometry and a lower housing member;
   c. mechanically coupling the upper housing member to the lower housing member; and
   d. compressing the housing assembly so that a transverse profile of the housing assembly is less than the transverse profile of the overhead space in the vehicle.

42. The method as recited in claim 41, wherein the at least one airbag cushion is attached near the inflator and folded behind the inflator within the compressible cavity of the housing assembly.

43. The method as recited in claim 42, wherein the airbag cushion is pulled from the compressed cavity of the housing assembly upon activation of the inflator.

44. The method as recited in claim 41, wherein compressing the housing assembly comprises applying a compression force to the upper housing member that collapses the compressible cavity.

45. The method as recited in claim 41, wherein mechanically coupling the upper housing member to the lower housing member comprises inserting guideposts in the lower housing member through orifices in the upper housing member.

46. The method as recited in claim 45, wherein compressing the housing assembly further comprises crimping the inserted guideposts into integrated rivets that fasten the lower housing member to the upper housing member.

* * * * *